US012039961B2

(12) United States Patent
Terada et al.

(10) Patent No.: US 12,039,961 B2
(45) Date of Patent: Jul. 16, 2024

(54) ELECTRONIC MUSICAL INSTRUMENT AND KEY OPERATION DETECTION METHOD

(71) Applicant: Roland Corporation, Shizuoka (JP)

(72) Inventors: Yuji Terada, Shizuoka (JP); Hidemasa Togai, Shizuoka (JP)

(73) Assignee: Roland Corporation, Shizuoka (JP)

( * ) Notice: Subject to any disclaimer, the term of this patent is extended or adjusted under 35 U.S.C. 154(b) by 0 days.

(21) Appl. No.: 18/335,141

(22) Filed: Jun. 15, 2023

(65) Prior Publication Data

US 2023/0326439 A1 Oct. 12, 2023

Related U.S. Application Data

(63) Continuation of application No. 16/984,089, filed on Aug. 3, 2020, now Pat. No. 11,741,924.

(30) Foreign Application Priority Data

Sep. 4, 2019 (JP) ................................ 2019-161113

(51) Int. Cl.
*G10H 1/34* (2006.01)
*G10D 7/00* (2006.01)
*G10H 1/053* (2006.01)

(52) U.S. Cl.
CPC ............... *G10H 1/344* (2013.01); *G10D 7/00* (2013.01); *G10H 1/053* (2013.01); *G10H 2210/525* (2013.01); *G10H 2230/155* (2013.01); *G10H 2250/461* (2013.01)

(58) Field of Classification Search
CPC ....... G10H 2250/461; G10H 2230/221; G10H 2230/241; G10H 2230/155; G10H 2230/205; G09B 15/06
See application file for complete search history.

(56) References Cited

U.S. PATENT DOCUMENTS 6,002,080 A * 12/1999 Tanaka ..................... G10H 1/34 84/649
6,037,533 A * 3/2000 Runyon ................. G10D 9/047 84/453
2007/0256539 A1* 11/2007 Flynn ..................... G09B 15/08 84/470 R (Continued)

FOREIGN PATENT DOCUMENTS

JP H0467697 6/1992
JP 2003162281 6/2003

OTHER PUBLICATIONS

"Office Action of US Counterpart U.S. Appl. No. 16/984,089", issued on Feb. 16, 2023, pp. 1-10.

(Continued)

*Primary Examiner* — Jeffrey Donels
(74) *Attorney, Agent, or Firm* — JCIPRNET

(57) ABSTRACT

An electronic musical instrument includes an instrument body and a plurality of keys, each of which has an operation surface operated by a player's finger is provided on an external surface of the instrument body. Among the plurality of keys, at least two keys are disposed to be adjacent to each other, and the operation surfaces of the at least two keys are configured to be inclined to descend toward between the at least two keys when viewed from a left-right direction of the electronic musical instrument.

21 Claims, 7 Drawing Sheets

(56) References Cited

U.S. PATENT DOCUMENTS

| | | | | |
|---|---|---|---|---|
| 2013/0196825 | A1* | 8/2013 | Silagy | A63B 21/023 482/49 |
| 2015/0190675 | A1* | 7/2015 | Silagy | A63B 21/05 482/49 |
| 2019/0096374 | A1* | 3/2019 | Harada | G10H 1/0551 |
| 2021/0312896 | A1* | 10/2021 | Sato | G10H 1/32 |

OTHER PUBLICATIONS

"Notice of Allowance of US Counterpart U.S. Appl. No. 16/984,089", issued on May 12, 2023, pp. 1-8.
"Notice of Reason for Refusal of Japan Counterpart Application", issued on Apr. 18, 2023, with English translation thereof, p. 1-p. 6.

* cited by examiner

ELECTRONIC MUSICAL INSTRUMENT AND KEY OPERATION DETECTION METHOD

CROSS-REFERENCE TO RELATED APPLICATION

This application is a continuation application of and claims priority benefit of a U.S. application Ser. No. 16/984,089, filed on Aug. 3, 2020, which claims the priority of Japan patent application serial no. 2019-161113, filed on Sep. 4, 2019. The entirety of each of the above-mentioned patent applications is hereby incorporated by reference herein and made a part of this specification.

BACKGROUND

Technical Field

The present disclosure relates to an electronic musical instrument and a key operation detection method, and particularly, to an electronic wind instrument and a key operation detection method which are capable of improving operability of keys.

Description of Related Art

Patent Document 1 discloses an electronic wind instrument allowing a player to make a playing by blowing breath while operating keys with the fingers. A plurality of keys are provided on an external surface of an instrument body of the electronic wind instrument.

PATENT DOCUMENTS

[Patent Document 1] Japanese Patent Laid-Open No. 2003-162281 (for example, paragraphs 0006 and 0008, FIGS. 1 and 3)

In such a type of electronic wind instrument, a plurality of keys may be operated by one finger. That is, a plurality of keys may be alternately pressed and played by moving fingers backward and forward between the plurality of keys. When such a playing is made, a finger may pass a key to be pressed, a key to be pressed may not be pressed, or another key may be pressed. Accordingly, there is a problem that the operability of the keys is low.

SUMMARY

An electronic wind instrument is provided. The electric wind instrument of the disclosure includes an instrument body and a plurality of keys which have an operation surface operated by a player's finger and are provided on an external surface of the instrument body. Among the plurality of keys, at least two keys disposed to sandwich or surround a predetermined region include restriction parts formed on the operation surfaces. The restriction parts restrict escape of the player's finger from between the at least two keys having the restriction parts formed thereon.

A key operation detection method in an electronic wind instrument is provided. The electronic wind instrument includes an instrument body and a plurality of keys which have an operation surface operated by a player's finger and are provided on an external surface of the instrument body. The key operation detection method includes forming restriction parts on the operation surfaces of at least two keys disposed to sandwich or surround a predetermined region among the plurality of keys, and detecting operations of the keys while restricting escape of the player's finger from between the at least two keys having the restriction parts formed thereon by the restriction parts.

DESCRIPTION OF THE EMBODIMENTS

The disclosure provides an electronic wind instrument capable of improving the operability of keys.

Figure 1A:
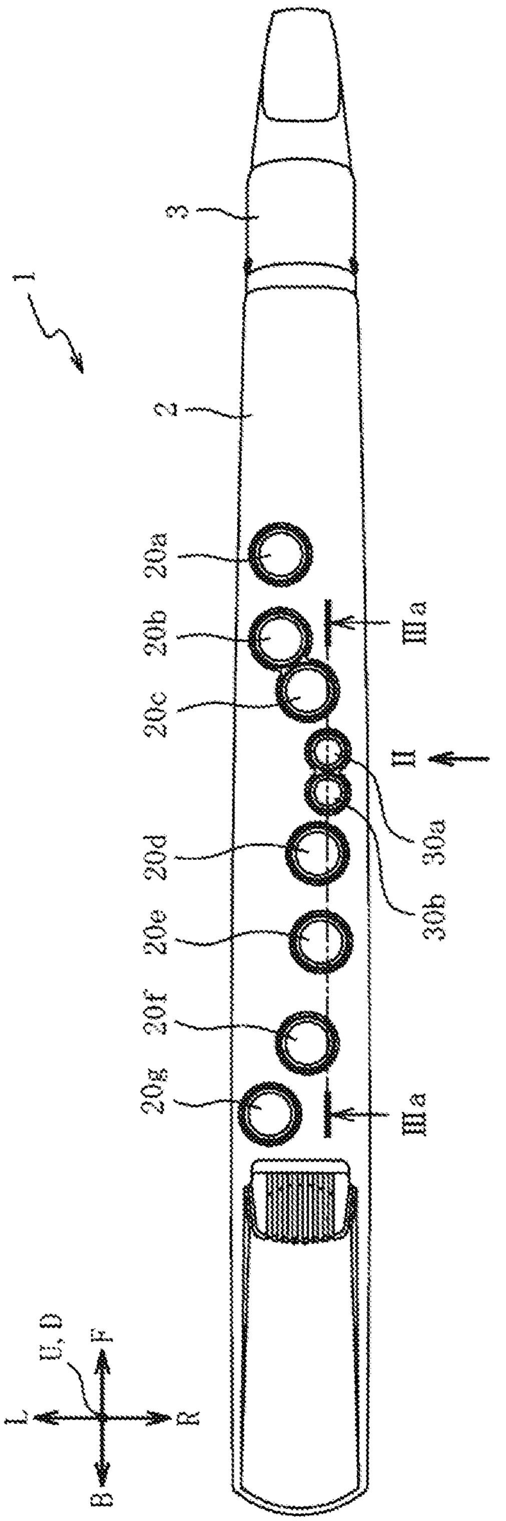
FIG. 1(A) is a top view of an electronic wind instrument in a first embodiment.
Figure 1B:
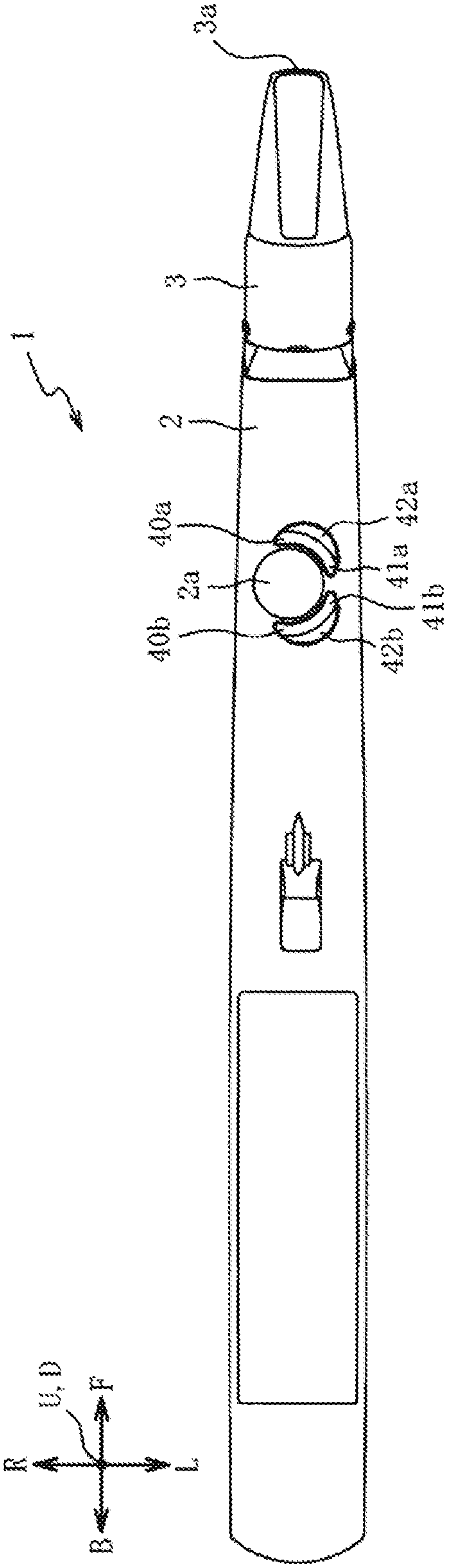
FIG. 1(B) is a bottom view of the electronic wind instrument.
Figure 2:
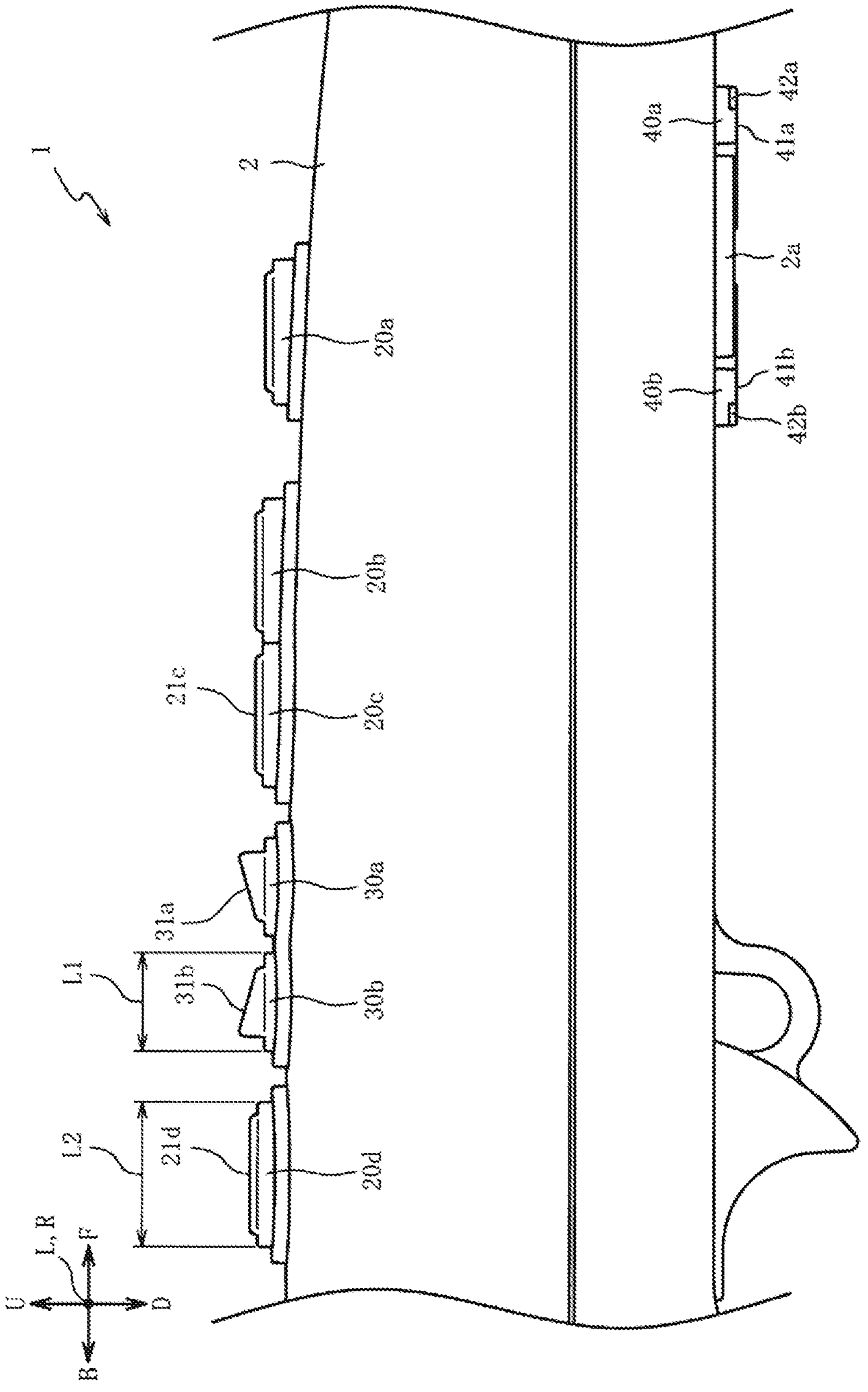
FIG. 2 is a partially enlarged side view of the electronic wind instrument when seen in a direction of an arrow II in FIG. 1(A).

Hereinafter, preferred embodiments will be described with reference to the accompanying drawings. First, the overall configuration of an electronic wind instrument 1 of a first embodiment will be described with reference to FIGS. 1 and 2. FIG. 1(A) is a top view of the electronic wind instrument 1 in the first embodiment, and FIG. 1(B) is a bottom view of the electronic wind instrument 1. FIG. 2 is a partially enlarged side view of the electronic wind instrument 1 when seen in a direction of an arrow II in FIG. 1(A).

Meanwhile, arrows U-D, F-B, and L-R shown in FIGS. 1(A), 1(B) and 2 indicate an up-down direction, a front-back direction, and a left-right direction of the electronic wind instrument 1, respectively, and the same applies in FIGS. 1(A), 1(B) and the subsequent drawings. However, the up-down direction, the front-back direction, and the left-right direction of the electronic wind instrument 1 do not necessarily match an up-down direction, a front-back direction, and a left-right direction when the electronic wind instrument 1 is used.

As shown in FIGS. 1(A), 1(B), the electronic wind instrument 1 is an electronic musical instrument imitating a recorder. The electronic wind instrument 1 includes an instrument body 2 in which various electronic components are disposed and a mouthpiece 3 which is mounted on a front end (an end on a side in a direction of an arrow F) of the instrument body 2.

Figure 3A:
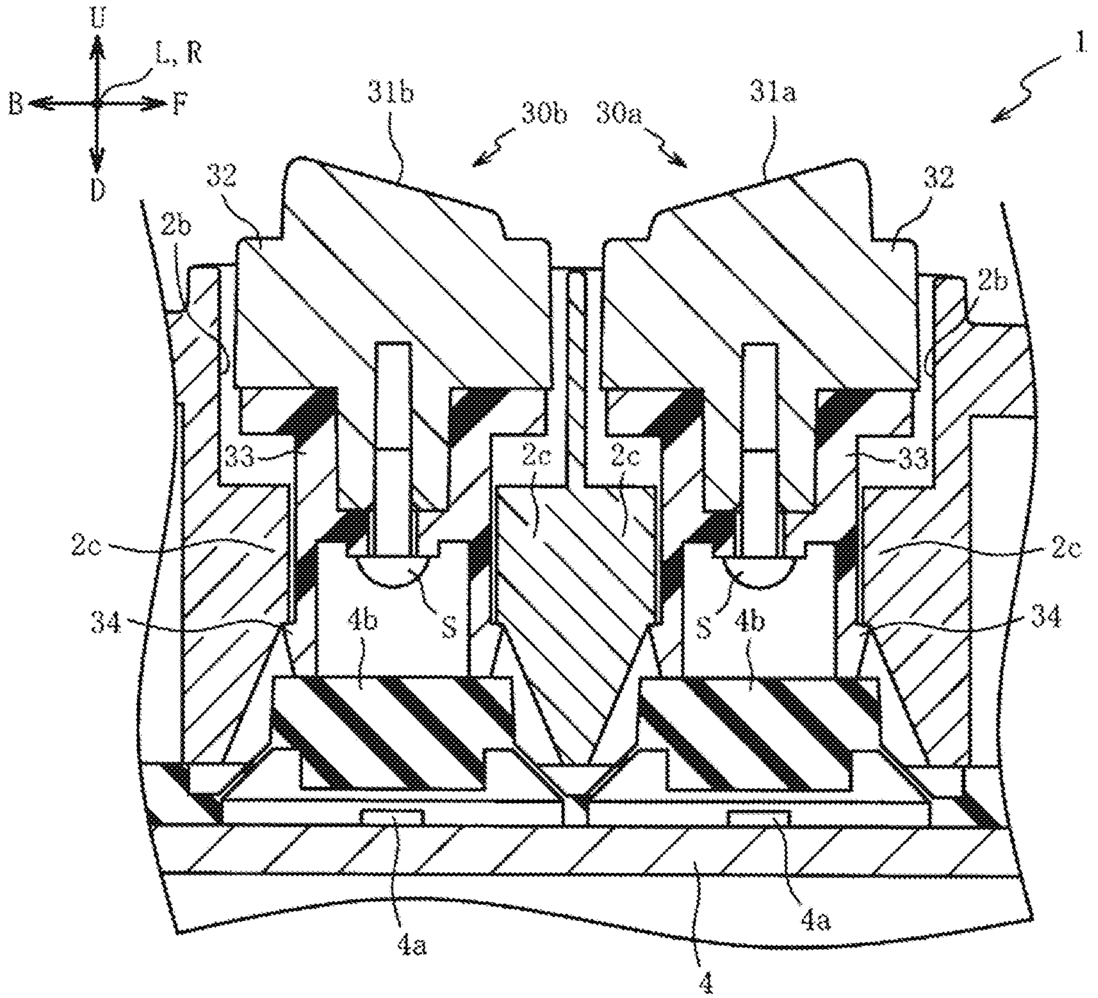
FIG. 3(A) is a partially enlarged cross-sectional view of the electronic wind instrument taken along a line IIIc-IIIc in FIG. 1(A)

The instrument body 2 is a housing in which electronic components such as a breath sensor (not shown) for detecting a player's breathing and a substrate 4 (see FIG. 3(A)) to which the breath sensor is connected are disposed. The instrument body 2 is formed to be elongate in the front-back direction (a direction of an arrow F-B) and is configured such that the mouthpiece 3 is detachably mounted at the front end thereof.

A blow-in port 3*a* (see FIG. 1(B)) is formed to be open at a front end of the mouthpiece 3. A change in atmospheric pressure accompanying the blowing of exhalation into the blow-in port 3*a* is detected by a breath sensor (not shown), and the volume or the like of a generated musical sound is controlled on the basis of a detection result.

Pitch keys 20*a* to 20*g* and pitch control keys 30*a* and 30*b* having a circular shape in a top view are provided on the upper surface of the instrument body 2 (see FIG. 1(A)), and octave keys 40*a* and 40*b* having a crescent shape in a bottom view are provided on the lower surface of the instrument body 2 (see FIG. 1(B)). These keys are keys for controlling the pitch of musical sound to be generated.

The plurality of pitch keys 20*a* to 20*g* (seven pitch keys in the present embodiment) are provided to be lined up in the order of the pitch keys 20*a*, 20*b*, 20*c*, 20*d*, 20*e*, 20*f*, and 20*g* from the front end side of the instrument body 2. These pitch keys 20*a* to 20*g* are provided in association with sound holes of a recorder. That is, the pitch keys 20*a* to 20*c* are keys provided to be pressed (operated) by an index finger to a ring finger of a player's left hand, and the pitch keys 20*d* to 20*g* are keys provided to be pressed by an index finger to a little finger of a player's right hand.

Accordingly, for example, when exhalation is blown into the blow-in port 3*a* in a state where all of the pitch keys 20*a* to 20*g* are pressed, a musical sound corresponding to a pitch of C4 is generated. When exhalation is blown into the blow-in port 3*a* in a state where the pitch keys 20*a* to 20*c* are pressed, a musical sound corresponding to a pitch of G4 is generated.

In a case where the pitch control keys 30*a* and 30*b* are pressed at the same time as the pitch keys 20*a* to 20*g*, the pitch control keys are keys for changing the pitch of a generated musical sound. Specifically, the pitch control key 30*a* is a key for raising a pitch by a halftone, and the pitch control key 30*b* is a key for lowering a pitch by a halftone. The pitch control keys 30*a* and 30*b* are provided as a pair so as to be adjacent to each other in a front-back direction and have a symmetrical shape with the center in a facing direction interposed therebetween (see FIG. 2).

For example, when exhalation is blown in a state where the pitch keys 20*a* to 20*c* and the pitch control key 30*a* are pressed, a musical sound corresponding to a pitch of G#4 (A♭4) is generated. On the other hand, when exhalation is blown in a state where the pitch keys 20*a* to 20*c* and the pitch control key 30*b* are pressed, a musical sound corresponding to a pitch of G♭4 (F#4) is generated. In this manner, it is possible to play using simpler fingering than that of a recorder by raising and lowering a pitch by a halftone through pressing of the pitch control keys 30*a* and 30*b*.

In addition, the pitch control keys 30*a* and 30*b* are disposed between the pitch key 20*c* and the pitch key 20*d* and provided as a pair with a predetermined region, assumed to be pressed by a little finger of a player's left hand, interposed therebetween. Accordingly, fingering close to that of a recorder can be performed using the pitch keys 20*a* to 20*g*, while it is possible to play using simpler fingering than that of the recorder while giving a feeling of playing close to that of the recorder by pressing the pitch control keys 30*a* and 30*b* with a little finger of a left hand which is not used during the playing of the recorder.

The octave key 40*a* is a key for raising a pitch by one octave, and the octave key 40*b* is a key for lowering a pitch by one octave. Accordingly, for example, a generated musical sound can be changed to a pitch of G3, G4, G5, or the like by pressing any one of the octave keys 40*a* and 40*b* while blowing exhalation in a state where the pitch keys 20*a* to 20*c* are pressed.

As shown in FIG. 2, the octave keys 40*a* and 40*b* are provided as a pair so as to be lined up in a front-back direction, but at least one of the octave keys 40*a* and 40*b* (the octave key 40*b* in the present embodiment) is disposed at a position vertically overlapping the pitch key 20*a* in a side view of the instrument body 2. That is, the octave keys 40*a* and 40*b* are provided as a pair so as to surround (sandwich) a predetermined region assumed to be pressed by a thumb of a player's left hand. In this manner, it is possible to give a feeling of playing close to that of a recorder by pressing the octave keys 40*a* and 40*b* with the thumb of the left hand which raises and lowers (thumbing) by one octave during the playing of the recorder.

A thumb rest 2*a* having a cylindrical shape protrudes from the lower surface of the instrument body 2 between the octave keys 40*a* and 40*b*. The octave keys 40*a* and 40*b* have a curved shape (crescent shape) along the outer circumference of the circular thumb rest 2*a* in a bottom view (see FIG. 1(B)). The thumb rest 2*a* is a part for placing a finger when the octave keys 40*a* and 40*b* are not being pressed.

The height of the thumb rest 2*a* from the lower surface of the instrument body 2 is set to be slightly (for example, 0.5 mm) lower than the heights of the octave keys 40*a* and 40*b*. Thereby, when a playing is performed by moving a finger backward and forward between the octave keys 40*a* and 40*b*, the finger can be slid along the thumb rest 2*a* having substantially the same height as the heights of the octave keys 40*a* and 40*b*, and thus it is possible to easily press the octave keys 40*a* and 40*b*.

The lower surfaces of the octave keys 40*a* and 40*b* are configured as operation surfaces 41*a* and 41*b* pressed by a player. In the operation surfaces 41*a* and 41*b*, rubber parts 42*a* and 42*b* are formed along an edge part on a side opposite to a side of a region (the thumb rest 2*a*) surrounded by the octave keys 40*a* and 40*b*. The operation surfaces 41*a* and 41*b* are formed using a material (for example, a metal or a resin) having a relatively low frictional force, while the rubber parts 42*a* and 42*b* are formed using a material having a frictional force higher than that of the operation surfaces (in the present embodiment, a rubber-like elastic body).

That is, the rubber parts 42*a*, 42*b* have a function as a restriction part that restricts escape of a player's finger from between the octave keys 40*a* and 40*b* by a frictional force (or give notice of being the edges of the octave keys 40*a* and 40*b*). Thereby, it is possible to prevent the finger from passing over the octave keys 40*a* and 40*b* when the finger is slid along the thumb rest 2*a* and moved backward and forward between the octave keys 40*a* and 40*b*. Accordingly, it is easy to press the octave keys 40*a* and 40*b*, and thus the operability of the octave keys 40*a* and 40*b* can be improved.

Further, the height of the thumb rest 2*a* from the lower surface of the instrument body 2 is set to be slightly lower than the heights of the octave keys 40*a* and 40*b*, and thus the finger can also be prevented from passing over the octave keys 40*a* and 40*b* by a force of sliding the finger along the thumb rest 2*a*. Accordingly, the operability of the octave keys 40*a* and 40*b* can be improved.

Meanwhile, in the present embodiment, the rubber parts 42*a* and 42*b* are provided so as to be buried in the operation surfaces 41*a* and 41*b* (the operation surfaces 41*a* and 41*b* and the rubber parts 42*a* and 42*b* are flush with each other), but a configuration in which the rubber parts 42*a* and 42*b* are formed to be higher than the operation surfaces 41*a* and 41*b* (to protrude downward) may be adopted.

The upper surfaces of the pitch control keys 30*a* and 30*b* are configured as operation surfaces 31*a* and 31*b* pressed by a player's finger. The operation surfaces 31*a* and 31*b* are formed to be inclined downward between the pitch control keys 30*a* and 30*b*. That is, the heights of the operation surfaces 31*a* and 31*b* from the upper surface of the instrument body 2 (a plane orthogonal to stroke directions of the pitch control keys 30*a* and 30*b*) are set to become larger as a distance from a portion between the pitch control keys 30*a* and 30*b* facing each other increases. Accordingly, the operation surfaces 31*a* and 31*b* have a function as a restriction part that restricts escape of a player's finger from between the pitch control keys 30*a* and 30*b*.

Figure 3B:
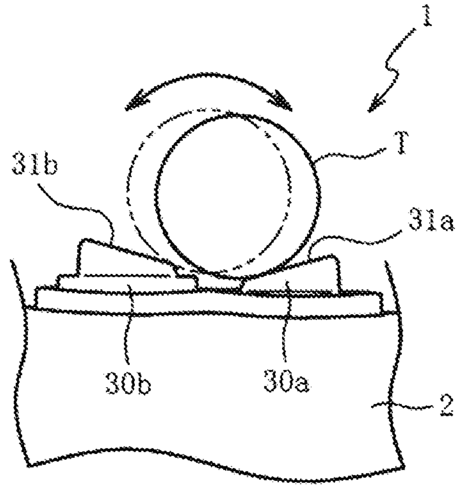
FIG. 3(B) is a partially enlarged side view of the electronic wind instrument showing a state where a pitch control key is pressed by rotating and moving a finger.
Figure 3C:
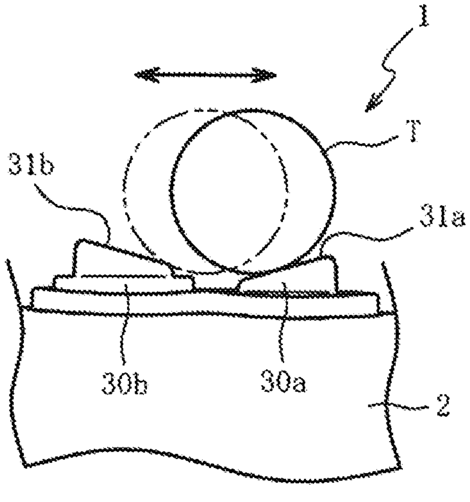
FIG. 3(C) is a partially enlarged side view of the electronic wind instrument showing a state where the pitch control key is pressed by sliding a finger.

Thereby, when an operation of moving a finger backward and forward between the pitch control keys 30*a* and 30*b* is performed (details of the operation are shown in FIGS. 3(B) and 3(C)), the pitch control keys 30*a* and 30*b* can prevent the finger from passing over. Accordingly, it is possible to easily press the pitch control keys 30*a* and 30*b* and prevent other keys (for example, the pitch keys 20*c* and 20*d*) from being pressed, and thus it is possible to improve the operability of the pitch control keys 30*a* and 30*b*.

In addition, the restriction part is formed by setting the heights of the operation surfaces 31*a* and 31*b* from the upper surface of the instrument body 2 to become larger as a distance from a portion between the pitch control keys 30*a* and 30*b* facing each other increases, and thus a function as a restricting part can be more reliably exhibited than in a case where the movement of a finger is restricted by frictional forces of the above-described rubber parts 42*a* and 42*b* (flush with the operation surfaces 41*a* and 41*b*). Further, the operation surfaces 31*a* and 31*b* are planes, and thus it is possible to improve the sense of touch when the finger touches the operation surfaces 31*a* and 31*b* as compared to a configuration in which a step is formed in the operation surfaces 31*a* and 31*b* (see FIG. 6(B) or 6(C)).

Here, as described above, the pitch keys 20*a* to 20*g* imitate sound holes of a recorder, and it is necessary to set an interval between the pitch key 20*c* and the pitch key 20*d* to be relatively small in order to bring a feeling of distance between a right hand and a left hand of the player close to that of when the player holds the instrument body 2 of the recorder. Accordingly, in the present embodiment, intervals between the pitch keys 20*c* and 20*d* and the pitch control keys 30*a* and 30*b* are set to be smaller than intervals between other pitch keys 20*a* to 20*g* (for example, between the pitch keys 20*a* and 20*b* and between the pitch keys 20*d* and 20*e*).

Accordingly, there is a concern that the pitch control keys 30*a* and 30*b* may be pressed by a finger pressing the pitch keys 20*c* and 20*d* depending on how the instrument body 2 is held and how it is played. On the other hand, in the present embodiment, the heights of top parts of the operation surfaces 31*a* and 31*b* of the pitch control keys 30*a* and 30*b* (a height from the upper surface of the instrument body 2) are set to be higher than those of the operation surfaces 21*c* and 21*d* of the pitch keys 20*c* and 20*d* adjacent to the pitch control keys 30*a* and 30*b*.

Thereby, a finger pressing the pitch keys 20*c* and 20*d* can be prevented from going into a region between the pitch control keys 30*a* and 30*b*, and thus it is possible to prevent the pitch control keys 30*a* and 30*b* from being erroneously pressed by other fingers.

Subsequently, detailed configurations of the pitch control keys 30*a* and 30*b* will be described with reference to FIG. 3(A). FIG. 3(A) is a partially enlarged cross-sectional view of the electronic wind instrument 1 taken along a line IIIc-IIIc in FIG. 1(A). Meanwhile, in FIG. 3(A), a portion of an internal structure of the instrument body 2 is not shown in order to simplify the drawing. In addition, a pushing structure of a sensor 4*a* according to the pitch control keys 30*a* and 30*b* to be described below has substantially the same configuration also in the pitch keys 20*a* to 20*g* and the octave keys 40*a* and 40*b*.

As shown in FIG. 3(A), the substrate 4 including the sensor 4*a* and a rubber elastic body 4*b* surrounding the sensor 4*a* is fixed to the inside of the instrument body 2. The sensor 4*a* fixed to the upper surface of the substrate 4 is a decompression sensor for detecting that the pitch control keys 30*a* and 30*b* have been pressed.

The rubber elastic body 4*b* is fixed to the upper surface of the substrate 4 in a state of having a space surrounding the sensor 4*a*. A through hole 2*b* penetrating toward the rubber elastic body 4*b* (the sensor 4*a*) from the upper surface (external surface) of the instrument body 2 is formed in the instrument body 2, and the pitch control keys 30*a* and 30*b* are inserted into the through hole 2*b*.

The pitch control keys 30*a* and 30*b* include substantially cylindrical-shaped operation parts 32 of which the upper surfaces are configured as the operation surfaces 31*a* and 31*b* and axis parts 33 to which the operation parts 32 are fixed. The axis part 33 is formed in a tubular shape, and the operation part 32 and the axis part 33 are fixed by a screw S in a state where a portion of a lower end side of the operation part 32 is inserted into the axis part 33.

Meanwhile, the operation part 32 includes a cylindrical-shaped large-diameter part having an outer diameter slightly smaller than an inner diameter of the through hole 2*b* and a substantially cylindrical-shaped small-diameter part formed on the upper surface of the large-diameter part and having an outer diameter smaller than that of the large-diameter part, and the upper surface of the small-diameter parts are the operation surfaces 31*a* and 31*b*.

A claw 34 protruding from the outer circumferential surface of the axis part 33 is formed on a lower end side of the axis part 33. An extending part 2*c* extending from the inner circumferential surface thereof is formed in the through hole 2*b*, and the claw 34 is hooked by a lower end portion of the extending part 2*c*, so that the pitch control keys 30*a* and 30*b* do not escape from the through hole 2*b*.

In an initial state where the pitch control keys 30*a* and 30*b* are not pressed and the claw 34 is hooked by the extending part 2*c*, the operation surfaces 31*a* and 31*b* of the operation part 32 are exposed by the upper surface (the through hole 2*b*) of the instrument body 2. When the operation surfaces 31*a* and 31*b* are pressed from the initial state, the pitch control keys 30*a* and 30*b* are displaced toward the substrate 4 side along the through hole 2*b* (the extending part 2*c*), so that the rubber elastic body 4*b* is pushed into the sensor 4*a* side by the axis part 33. The rubber elastic body 4*b* comes into contact with the sensor 4*a* while being elastically deformed due to the pushing, and pressure generated by the contact (pushing) is detected by the sensor 4*a*.

On the other hand, when the pressing of the pitch control keys 30*a* and 30*b* is cancelled, the pitch control keys 30*a* and 30*b* are pushed up due to an elastic recovery force of the rubber elastic body 4*b*, thereby turning to an initial state where the claw 34 is hooked by the extending part 2*c*. Thereby, whether or not the pitch control keys 30*a* and 30*b* have been pressed (turned on/turned off) is detected by the sensor 4*a*.

In this manner, stroke directions of the pitch control keys 30*a* and 30*b* are along a penetration direction of the through hole 2*b* (the extending part 2*c*). On the other hand, in a case where a finger moves backward and forward between the pitch control keys 30*a* and 30*b*, a moving direction of a finger does not match the stroke directions of the pitch control keys 30*a* and 30*b*. However, in the present embodiment, a configuration in which the pitch control keys 30*a* and 30*b* can be smoothly pressed in such a case is also adopted. This configuration will be described with reference to FIGS. 3(B) and 3(C).

FIG. 3(B) is a partially enlarged side view of the electronic wind instrument 1 showing a state where the pitch control keys 30*a* and 30*b* are pressed by moving a finger T while rotating the finger, and FIG. 3(C) is a partially enlarged side view of the electronic wind instrument 1 showing a state where the pitch control keys 30*a* and 30*b* are operated by sliding the finger T.

Meanwhile, FIGS. 3(B) and 3(C) schematically show the shape of a player's finger T and show the finger T before pressing by an alternating two dots-dashed line.

As shown in FIG. 3(B), the operation (pressing) of the pitch control keys 30*a* and 30*b* may be performed by moving the finger T backward and forward while the rotating the finger between the pitch control keys 30*a* and 30*b*. In this case, since the operation surfaces 31*a* and 31*b* of the pitch control keys 30*a* and 30*b* are planes of which the heights increase gradually as a distance from a portion between the pitch control keys 30*a* and 30*b* facing each other increases, a force at the time of twisting the finger T is received by the inclined operation surfaces 31*a* and 31*b*, so that the force is easily transmitted in the stroke direction (pressing direction) of the pitch control keys 30*a* and 30*b*.

That is, it is possible to detect the operation (pressing) of the pitch control keys 30*a* and 30*b* using a force received by the operation surfaces 31*a* and 31*b* at the time of restricting the movement of a player's finger while restricting the escape of the finger from between the pitch control keys 30*a* and 30*b* by the operation surfaces 31*a* and 31*b*. Accordingly, it is possible to smoothly press the pitch control keys 30*a* and 30*b* while moving the finger backward and forward between the pitch control keys 30*a* and 30*b*.

On the other hand, as shown in FIG. 3(C), an operation of pressing the pitch control keys 30*a* and 30*b* while sliding the finger T backward and forward may also be performed. In this case, the operation surfaces 31*a* and 31*b* are inclined planes, and thus the pitch control keys 30*a* and 30*b* are easily pressed in association with the siding of the finger T along the operation surfaces 31*a* and 31*b*. That is, it is possible to detect the operation (pressing) of the pitch control keys 30*a* and 30*b* using a force received by the operation surfaces 31*a* and 31*b* at the time of restricting the movement of a player's finger while restricting the escape of the finger from between the pitch control keys 30*a* and 30*b* by the operation surfaces 31*a* and 31*b*. Accordingly, it is possible to smoothly press the pitch control keys 30*a* and 30*b* while moving the finger backward and forward between the pitch control keys 30*a* and 30*b*.

In this manner, according to the present embodiment, it is possible to smoothly perform an operation of alternately pressing the pitch control keys 30*a* and 30*b*. Further, even when such an operation is rapidly performed, restriction parts (the inclined operation surfaces 31*a* and 31*b*) are formed in the pitch control keys 30*a* and 30*b*, and thus it is possible to prevent a finger from passing over the pitch control keys 30*a* and 30*b*. That is, even when a complicated playing in which a pitch is rapidly raised or lowered by halftone is performed, it is possible to accurately press the pitch control keys 30*a* and 30*b*.

In addition, an interval between the pitch control keys 30*a* and 30*b* is set to be smaller than an interval between other keys (for example, between the pitch keys 20*a* and 20*b* and between the pitch keys 20*d* and 20*e*) (see FIG. 1(A), 1(B) or 2). Thereby, a distance between the centers (axes) of the pitch control keys 30*a* and 30*b* can be reduced, and thus it is possible to rapidly raise and lower a pitch by halftone by pressing the pitch control keys 30*a* and 30*b* even when the pitch control keys 30*a* and 30*b* are pressed with a relatively thin little finger.

In addition, as shown in FIG. 2, an external dimension L1 (diameter) of each of the pitch control keys 30*a* and 30*b* in an arrangement direction of the pitch control keys 30*a* and 30*b* is set to be smaller than an external dimension L2 (diameter) of each of other pitch keys 20*a* to 20*g* in an arrangement direction, and thus a distance between the centers (axes) of the pitch control keys 30*a* and 30*b* can be further reduced. Accordingly, it is possible to further rapidly raise and lower a pitch by halftone by pressing the pitch control keys 30*a* and 30*b*.

Subsequently, a second embodiment will be described with reference to FIGS. 4 and 5. In the first embodiment, a case where restriction parts are provided in the pitch control keys 30*a* and 30*b* and the octave keys 40*a* and 40*b* of the instrument body 2 has been described. On the other hand, in the second embodiment, a case where restriction parts are provided in effect keys 250*a* to 250*c* will be described. Meanwhile, portions the same as those in the above-described first embodiment will be denoted by the same reference numerals and signs, and description thereof will be omitted.

Figure 4A:
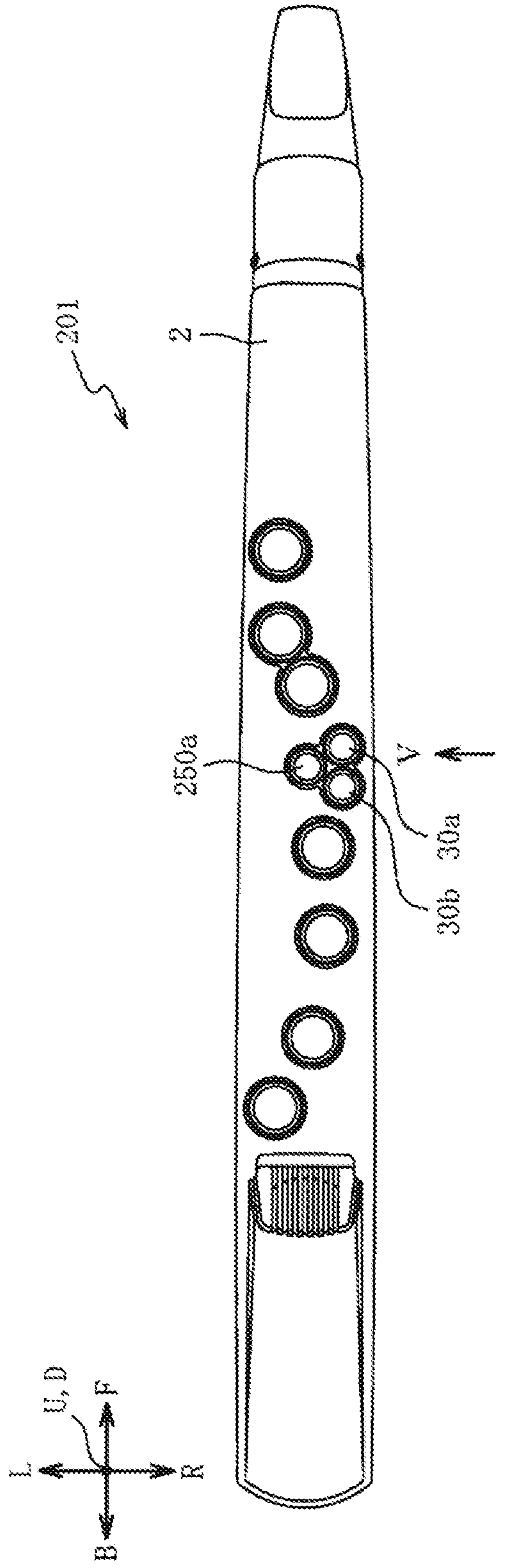
FIG. 4(A) is a top view of an electronic wind instrument in a second embodiment.
Figure 4B:
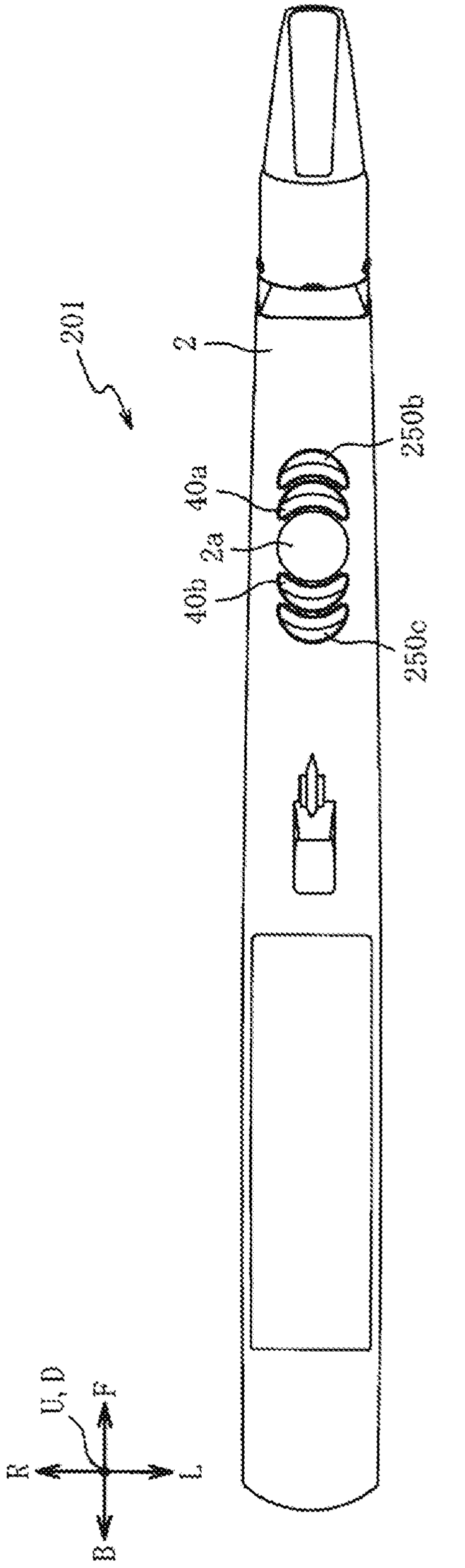
FIG. 4(B) is a bottom view of the electronic wind instrument.

FIG. 4(A) is a top view of an electronic wind instrument 201 in the second embodiment, and FIG. 4(B) is a bottom view of the electronic wind instrument 201. FIG. 5 is a partially enlarged side view of the electronic wind instrument 201 when seen in a direction of an arrow V in FIG. 4(A).

Figure 5:
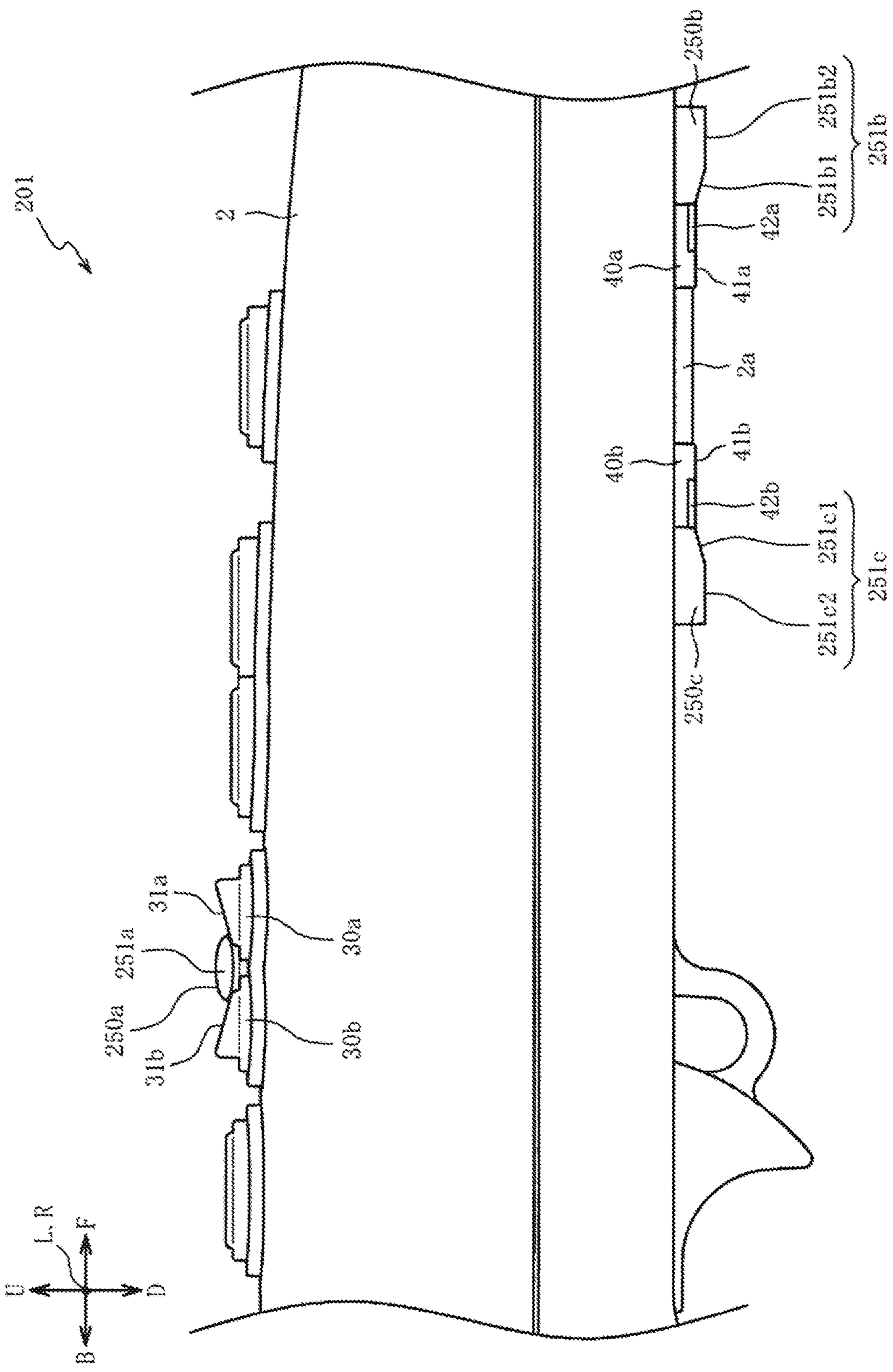
FIG. 5 is a partially enlarged side view of the electronic wind instrument when seen in a direction of an arrow V in FIG. 4(A).

As shown in FIGS. 4 and 5, the effect key 250*a* having a circular shape in a top view is provided on the upper surface of an instrument body 2 of the electronic wind instrument 201, and the pair of effect keys 250*b* and 250*c* having a crescent shape in a bottom view are provided on the lower surface of the instrument body 2. The effect keys 250*a* to 250*c* are keys for setting an effect to be imparted to a musical sound.

The effect key 250*a* is provided to be adjacent to each of pitch control keys 30*a* and 30*b*. The upper surface of the effect key 250*a* is configured as an operation surface 251*a* (see FIG. 5) which is pressed by a player's finger. Meanwhile, the structure of the effect key 250*a* has the same configuration as those of the pitch control keys 30*a* and 30*b* except that an inclination direction of the operation surface 251*a* is different.

The operation surface 251*a* is a plane (restriction part) which is inclined to descend toward a portion between the pitch control keys 30*a* and 30*b* facing each other. Thereby, it is possible to prevent the finger from passing over the effect key 250*a* in a case where the effect key 250*a* is pressed while moving the finger backward and forward between the pitch control keys 30*a* and 30*b*. That is, it is possible to restrict the finger protruding from a region surrounded by the pitch control keys 30*a* and 30*b* and the effect key 250*a* by operation surfaces 31*a* and 31*b* and the operation surface 251*a*. Accordingly, it is possible to improve the operability of the pitch control keys 30*a* and 30*b* and the effect key 250*a*.

In addition, the operation surface 251*a* is a plane which is inclined to descend toward a portion between the pitch control keys 30*a* and 30*b* facing each other, and thus the same effects as those of the above-described operation surfaces 31*a* and 31*b* (for example, an effect in which the effect key 250*a* is easily pressed in association with the sliding of the finger along the operation surface 251*a*) are exhibited.

Meanwhile, the heights of upper ends (lower ends) of the operation surfaces 31*a* and 31*b* and the operation surface 251*a* from the upper surface of the instrument body 2 are the same, but a configuration in which the height of an upper end (lower end) of any one operation surface is set to be high or low may be adopted.

The effect key 250*b* is provided to be adjacent to a front side (a side in a direction of an arrow F) of an octave key 40*a*, and the effect key 250*c* is provided to be adjacent to a rear side (a side in a direction of an arrow B) of an octave key 40*b*. Meanwhile, the octave keys 40*a* and 40*b* have the same configurations as those in the first embodiment except that the pair of octave keys 40*a* and 40*b* are disposed at positions which are point-symmetrical to each other around the center of a thumb rest 2*a* in a bottom view.

The lower surfaces of the effect keys 250*b* and 250*c* are configured as operation surfaces 251*b* and 251*c* (see FIG. 5) pressed by a player's finger. The operation surfaces 251*b* and 251*c* include inclined parts 251*b*1 and 251*c*1 constituting a part on a side between the operation surfaces facing each other (the thumb rest 2*a* side) and flat parts 251*b*2 and 251*c*2 constituting a part on a side opposite to the side between the operation surfaces.

The flat parts 251*b*2 and 251*c*2 of the operation surfaces 251*b* and 251*c* are flat surfaces having a fixed height from the lower surface of the instrument body 2, and the inclined parts 251*b*1 and 251*c*1 are planes that are inclined to ascend toward a portion between the effect keys 250*b* and 250*c* facing each other. That is, the heights of the inclined parts 251*b*1 and 251*c*1 from the lower surface (a plane orthogonal to a stroke directions of the effect keys 250*b* and 250*c*) of the instrument body 2 are set to become larger as a distance from a portion between the effect keys 250*b* and 250*c* facing each other increases.

Thereby, it is possible to prevent a finger from passing over the effect keys 250*b* and 250*c* in a case where the effect keys 250*b* and 250*c* are pressed while moving the finger backward and forward between the octave keys 40*a* and 40*b* (sliding the finger along the thumb rest 2*a*). In addition, it is possible to reliably prevent the finger from passing through the effect keys 250*b* and 250*c* by two restriction parts of rubber parts 42*a* and 42*b* of the octave keys 40*a* and 40*b* and the inclined parts 251*b*1 and 251*c*1 of the operation surfaces 251*b* and 251*c*.

That is, it is possible to restrict the finger protruding from a region surrounded by the octave keys 40*a* and 40*b* and effect keys 250*b* and 250*c* by the rubber parts 42*a* and 42*b* and the operation surfaces 251*b* and 251*c* (the inclined parts 251*b*1 and 251*c*1). Accordingly, it is possible to improve the operability of the octave keys 40*a* and 40*b* and the effect keys 250*b* and 250*c*.

In addition, the inclined parts 251*b*1 and 251*c*1 of the operation surfaces 251*b* and 251*c* are planes that are inclined to descend toward a portion between the effect keys 250*b* and 250*c* facing each other, and thus the same effects as those of the above-described operation surfaces 31*a* and 31*b* ((for example, an effect in which the effect keys 250*b* and 250*c* are easily pressed in association with the sliding of the finger along the inclined parts 251*b*1 and 251*c*1 of the operation surfaces 251*b* and 251*c*) are exhibited.

Meanwhile, the heights of the upper ends (an end on the thumb rest 2*a* side) of the inclined parts 251*b*1 and 251*c*1 of the operation surfaces 251*b* and 251*c* (a height from the lower surface of the instrument body 2) are the same as the heights of the operation surfaces 41*a* and 41*b* of the octave keys 40*a* and 40*b*, but a configuration in which the heights of the upper ends of the inclined parts 251*b*1 and 251*c*1 are set to be smaller or slightly larger than those of the operation surfaces 41*a* and 41*b* may be adopted.

Subsequently, a modification example of the operation surfaces 31*a* and 31*b* (restriction parts) of the pitch control keys 30*a* and 30*b* will be described with reference to FIGS. 6 and 7. FIGS. 6 and 7 are partially enlarged side views of an electronic wind instrument showing a modification example of the pitch control keys 30*a* and 30*b*.

In the above-described embodiments, a case where the operation surfaces 31*a* and 31*b* of the pitch control keys 30*a* and 30*b* are planes that are inclined to descend toward a portion between the pitch control keys 30*a* and 30*b* facing each other has been described, but the disclosure is not necessarily limited thereto. For example, as shown in FIG. 6(A), the operation surfaces 31*a* and 31*b* may be configured as curved surfaces recessed toward the instrument body 2 side.

Figure 6A:
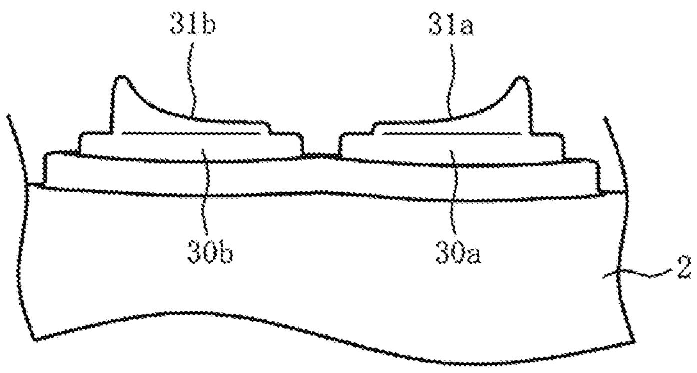
FIGS. 6(A)~6(C) are partially enlarged side views of an electronic wind instrument showing a modification example of a pitch control key.
Figure 6B:
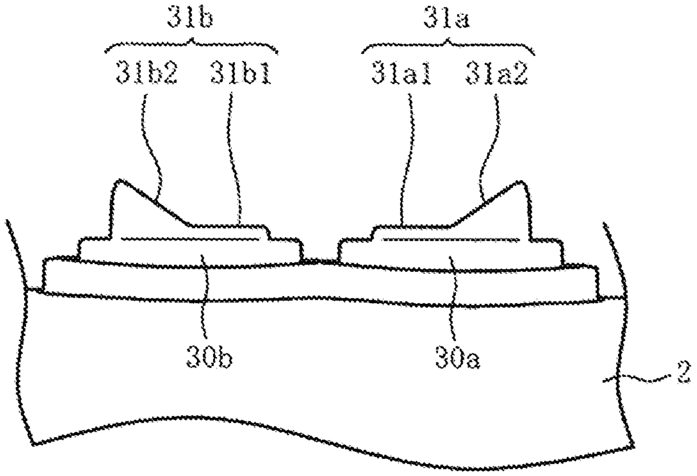

In addition, as shown in FIG. 6(B), flat surfaces 31*a*1 and 31*b*1 having a fixed height from the upper surface of the instrument body 2 and inclined surfaces 31*a*2 and 31*b*2 inclined to descend toward the pitch control keys 30*a* and 30*b* may be combined with each other to configure the operation surfaces 31*a* and 31*b*. More specifically, the operation surfaces 31*a* and 31*b* may be configured by disposing the flat surfaces 31*a*1 and 31*b*1 on a side between the pitch control keys 30*a* and 30*b* facing each other and disposing the inclined surfaces 31*a*2 and 31*b*2 on a side opposite to the side between the pitch control keys.

Figure 6C:
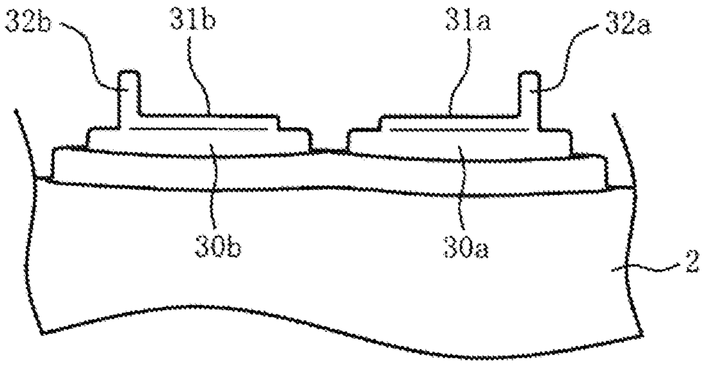

In addition, as shown in FIG. 6(C), a configuration may be adopted in which the operation surfaces 31*a* and 31*b* are configured as flat surfaces having a fixed height from the instrument body 2, and projections 32*a* and 32*b* protruding upward are formed at ends of the operation surfaces 31*a* and 31*b* on a side opposite to a portion between the pitch control keys 30*a* and 30*b* facing each other.

As in these modification examples shown in FIGS. 6(A) ~6(C), in the case of a configuration in which portions of the operation surfaces 31*a* and 31*b* protrude at ends on a side opposite to a portion between the pitch control keys 30*a* and 30*b* facing each other, a function as a restriction part can be provided. That is, in the case of a configuration in which the movement of a finger can be restricted, the shapes of the operation surfaces 31*a* and 31*b* can be appropriately set.

Figure 7A:
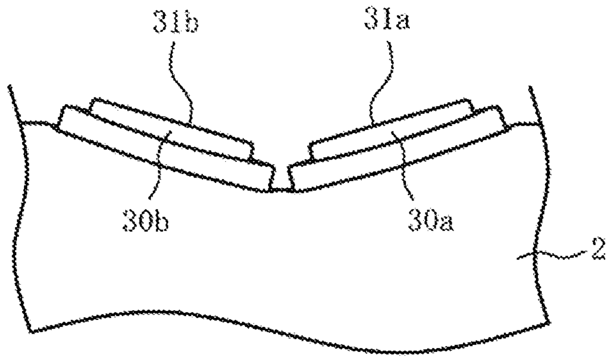
FIGS. 7(A)~7(C) are partially enlarged side views of an electronic wind instrument showing a modification example of a pitch control key.

In the above-described embodiments, a case where stroke directions of the pitch control keys 30*a* and 30*b* match each other has been described, but the disclosure is not necessarily limited thereto. For example, as shown in FIG. 7(A), a configuration in which the operation surfaces 31*a* and 31*b* are flat surfaces having a fixed height from the upper surface of the instrument body 2, and the stroke directions of the pitch control keys 30*a* and 30*b* are mutually inclined may be adopted.

Also in this configuration, stroke directions of the pitch control keys 30*a* and 30*b* are set such that the operation surfaces 31*a* and 31*b* are inclined to descend toward a side between the operation surfaces facing each other, and thus it is possible to impart a function as a restriction part to the operation surfaces 31*a* and 31*b*. In addition, according to this configuration, in a case where the pitch control keys 30*a* and 30*b* are pressed while moving a finger backward and forward between the pitch control keys 30*a* and 30*b*, a force of the finger is easily transmitted in a direction in which the pitch control keys 30*a* and 30*b* are pushed. Meanwhile, in a case where the stroke directions of the pitch control keys 30*a* and 30*b* are mutually inclined, a substrate 4 (see FIGS. 3(A)~3(C)) may be inclined in accordance with the stroke directions.

In the above-described embodiments, a case where the pitch control keys 30*a* and 30*b* are disposed adjacent to each other has been described, but the disclosure is not necessarily limited thereto. For example, as shown in FIGS. 7(B) and 7(C), a configuration in which rotation means such as a cylindrical-shaped roller 5 or a ball caster 6 is provided between the pitch control keys 30*a* and 30*b* facing each other may be adopted.

Figure 7B:
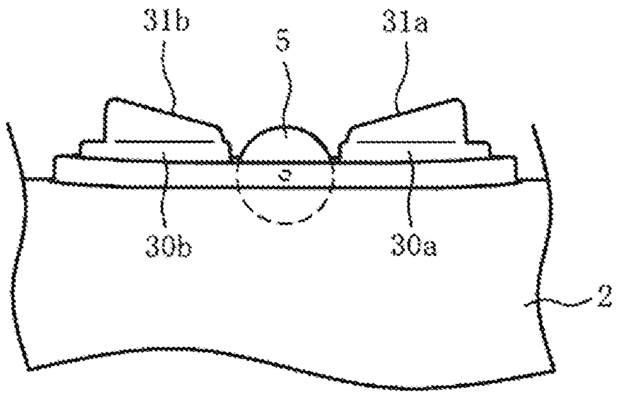
Figure 7C:
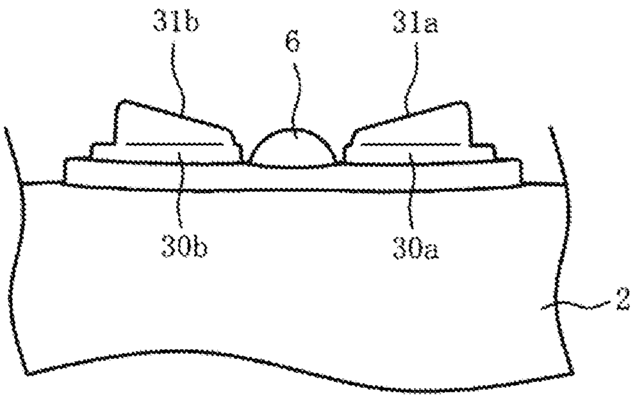

The roller 5 is axially supported by the instrument body 2 in a posture in which the axis thereof is directed in a direction (a direction along the upper surface of the instrument body 2) orthogonal to a facing direction of the pitch control keys 30*a* and 30*b* (a left-right direction in FIG. 7(B)). In this manner, when the roller 5 and the ball caster 6 exposed from the upper surface (external surface) of the instrument body 2 are provided between the pitch control keys 30*a* and 30*b* facing each other, the movement of a finger between the pitch control keys 30*a* and 30*b* can be guided by the roller 5 or the ball caster 6.

Thereby, even when the pitch control keys 30*a* and 30*b* are disposed to be separated from each other (cannot be disposed close to each other), it is possible to rapidly raise and lower a pitch by halftone. Further, the inclined operation surfaces 31*a* and 31*b* are formed in the pitch control keys 30*a* and 30*b*, and thus it is possible to prevent the finger from passing over the pitch control keys 30*a* and 30*b* due to a force guided by the rotation of the roller 5 or the ball caster 6.

Further, in a case where the roller 5 and the ball caster 6 are provided, it is preferable that the heights of lower ends of the operation surfaces 31*a* and 31*b* and the height of an upper end of the roller 5 or the ball caster 6 match each other. Thereby, it is possible to smoothly guide the backward movement and forward movement of a finger between the operation surfaces 31*a* and 31*b* by the roller 5 or the ball caster 6.

In addition, it is preferable that the upper end of the roller 5 or the ball caster 6 be set to be slightly higher than the lower ends of the operation surfaces 31*a* and 31*b*. Thereby, it is possible to further smoothly guide the backward movement and forward movement of a finger between the operation surfaces 31*a* and 31*b* by the roller 5 or the ball caster 6.

Although description has been given on the basis of the above-described embodiments, the disclosure is not limited to the above-described embodiments, and it can be easily inferred that various modifications and improvements can be made without departing from the scope of the disclosure. For example, in the above-described embodiments, the electronic wind instruments 1 and 201 may be configured by replacing or combining a portion or the entirety of one embodiment with a portion or the entirety of one or other embodiments.

Accordingly, the shapes of the operation surfaces 31*a* and 31*b* of the pitch control keys 30*a* and 30*b*, the stroke directions, or the configurations of rotation means shown in FIGS. 6 and 7 may be applied to the octave keys 40*a* and 40*b* or the effect keys 250*a* to 250*c*. In addition, the configurations of the rubber parts 42*a* and 42*b* of the octave keys 40*a* and 40*b* may be applied to the pitch control keys 30*a* and 30*b* or the effect keys 250*a* to 250*c*. In addition, the configurations of the operation surfaces 251*b* and 251*c* of the effect keys 250*b* and 250*c* may be applied to the pitch control keys 30*a* and 30*b* or the octave keys 40*a* and 40*b*.

In addition, a configuration may be adopted in which a restriction part constituted by an inclined operation surface is formed in one key (for example, the pitch control keys 30*a*) among a plurality of keys (for example, the pitch control keys 30*a* and 30*b* and the effect key 250*a*) interposing or surrounding a predetermined region, and a restriction part constituted by a rubber part is formed in the other keys (for example, the pitch control key 30*b* and the effect key 250*a*).

In addition, a configuration equivalent to the thumb rest 2*a* may be provided in a region between the pitch control keys 30*a* and 30*b* or a region surrounded by the pitch control keys 30*a* and 30*b* and the effect key 250*a*.

In the above-described embodiments, a recorder has been illustrated as an example of a musical instrument imitated by the electronic wind instruments 1 and 201, but the disclosure is not necessarily limited thereto. For example, the electronic wind instruments 1 and 201 may be configured as an electronic musical instrument imitating other wind instruments (a saxophone, a Hulusi, or the like).

In the above-described embodiments, a case where an inclined operation surface or rubber part (restriction part) is formed in two keys (for example, the pitch control keys 30*a* and 30*b*), three keys (the pitch control keys 30*a* and 30*b* and the effect key 250*a*), or four keys (the octave keys 40*a* and 40*b* and the effect keys 250*b* and 250*c*) has been described, but the disclosure is not necessarily limited thereto.

In the case of a configuration in which it is possible to prevent a player's finger from protruding from a predetermined region (it is possible to prevent a finger from passing over a key positioned on the outermost side in the predetermined region) in a case where there is the predetermined region in which it is assumed that a finger moves backward and forward between a plurality of keys, the number or arrangement of keys forming a restriction part can be appropriately set. Accordingly, for example, a configuration in which a restriction part is provided in the key positioned on the outermost side in the predetermined region may be adopted, or a configuration in which a restriction part is provided in all of the keys may be adopted.

In the above-described embodiments, description has been given of a case where the operation parts 32 of the pitch control keys 30*a* and 30*b* include a cylindrical-shaped large-diameter part having an outer diameter slightly smaller than an inner diameter of the through hole 2*b*, and a substantially cylindrical-shaped small-diameter part formed on the upper surface of the large-diameter part and having an outer diameter smaller than that of the large-diameter part, and the upper surface of the small-diameter part is configured as the operation surfaces 31*a* and 31*b*, but the disclosure is not necessarily limited thereto. For example, a configuration may be adopted in which the outer diameter of the small-diameter part is matched to the outer diameter of the large-diameter part (a step is eliminated), and the operation surfaces 31*a* and 31*b* are formed on the entire upper surfaces of the operation parts 32.

In the above-described embodiments, description has been given of a case where the rubber parts 42*a* and 42*b* function as restriction parts by forming the rubber parts using a material having a higher frictional force than those of the operation surfaces 41*a* and 41*b*, but the disclosure is not necessarily limited thereto. Any means is not limited as long as the means can increase a frictional force of a portion of the operation surface. Accordingly, a configuration in which a frictional force is increased by roughening a portion of the operation surface through, for example, embossing (fine unevenness) may be adopted.

In the above-described embodiments, a case where the thumb rest 2*a* is formed in a cylindrical shape, and the lower surface of the thumb rest 2*a* is a flat surface has been described, but the disclosure is not necessarily limited thereto. For example, the thumb rest 2*a* may be formed in a cube shape, a rectangular parallelepiped shape (a polygonal shape in a bottom view), or a truncated cone shape. In addition, irregularities may be provided in the lower surface of the thumb rest 2*a*.

What is claimed is:

1. An electronic musical instrument comprising:

an instrument body; and a plurality of keys, each of which having an operation surface operated by a player's finger and being provided on an external surface of the instrument body, wherein among the plurality of keys, at least two keys are disposed to be adjacent to each other, and the operation surfaces of the at least two keys are configured to incline toward each other when viewed from a left-right direction of the electronic musical instrument.

2. The electronic musical instrument according to claim 1, wherein the at least two keys comprise restriction parts formed on the operation surfaces such that the farther the restriction parts from between the at least two keys are, the higher the restriction parts are.

3. The electronic musical instrument according to claim 2, wherein the operation surfaces of the at least two keys having the restriction parts formed thereon are planes of which heights increase gradually as far from between the at least two keys.

4. The electronic musical instrument according to claim 2, wherein heights of top parts of the operation surfaces of the at least two keys having the restriction parts formed thereon are set to be larger than those of the operation surfaces of other keys adjacent to the at least two keys having the restriction parts formed thereon.

5. The electronic musical instrument according to claim 3, wherein heights of top parts of the operation surfaces of the at least two keys having the restriction parts formed thereon are set to be larger than those of the operation surfaces of other keys adjacent to the at least two keys having the restriction parts formed thereon.

6. The electronic musical instrument according to claim 2, wherein the at least two keys having the restriction parts formed thereon comprise a pair of keys that change a pitch of a generated musical sound.

7. The electronic musical instrument according to claim 2, wherein the at least two keys comprise a pair of keys adjacent to each other in a front-back direction or a pair of keys having a plane inclining toward each other.

8. The electronic musical instrument according to claim 2, wherein the at least two keys having the restriction parts formed thereon further comprise an effect key for setting an effect to be imparted to a generated musical sound.

9. The electronic musical instrument according to claim 6, wherein the pair of keys comprise a key for raising a pitch by halftone and a key for lowering a pitch by halftone.

10. The electronic musical instrument according to claim 6, wherein the pair of keys comprise a key for raising a pitch by one octave and a key for lowering a pitch by one octave.

11. The electronic musical instrument according to claim 6, wherein a rubber part is formed on the operation surface of the pair of keys.

12. The electronic musical instrument according to claim 7, wherein a rubber part is formed on the operation surface of the pair of keys.

13. The electronic musical instrument according to claim 6, wherein an interval between the at least two keys having the restriction parts formed thereon is set to be smaller than an interval between other keys other than the at least two keys.

14. The electronic musical instrument according to claim 13, wherein external dimensions of the keys which are external dimensions in an arrangement direction of the keys adjacent to each other are set to be smaller in the at least two keys having the restriction parts formed thereon than those of the other keys other than the at least two keys.

15. The electronic musical instrument according to claim 2, further comprising:

a rotation member which is rotatably provided between the at least two keys having the restriction parts formed thereon and guides movement of the player's finger within the at least two keys.

16. An electronic musical instrument comprising:

a body; and at least two control keys which are provided on a surface of the body, each of the at least two control keys having an operation surface, wherein the operation surfaces of the at least two control keys are configured to slope downwards toward each other when viewed from a left-right direction of the electronic musical instrument.

17. A key operation detection method in an electronic musical instrument comprising an instrument body and a plurality of keys, each of which having an operation surface operated by a player's finger and being provided on an external surface of the instrument body, the key operation detection method comprising:

disposing at least two of the keys to be adjacent to each other;

configuring the operation surfaces of the at least two keys to incline toward each other when viewed from a left-right direction of the electronic musical instrument; and detecting operations of the keys while restricting escape of the player's finger from the at least two keys.

18. The key operation detection method according to claim 17, wherein the at least two keys are among the plurality of keys, and the method further comprises forming restriction parts on the operation surfaces such that the farther the restriction parts from between the at least two keys are, the higher the restriction parts are.

19. The key operation detection method according to claim 18, wherein the operation surfaces of the at least two keys having the restriction parts formed thereon are planes of which heights increase gradually as far from between the at least two keys.

20. The key operation detection method according to claim 18, wherein heights of top parts of the operation surfaces of the at least two keys having the restriction parts formed thereon are set to be larger than those of the operation surfaces of other keys adjacent to the at least two keys having the restriction parts formed thereon.

21. The key operation detection method according to claim 20, wherein heights of top parts of the operation surfaces of the at least two keys having the restriction parts formed thereon are set to be larger than those of the operation surfaces of other keys adjacent to the at least two keys having the restriction parts formed thereon.

* * * * *